United States Patent
Liu

(10) Patent No.: US 10,610,989 B1
(45) Date of Patent: Apr. 7, 2020

(54) RIM DRILLING AND MILLING MACHINE

(71) Applicant: TOP-ONE MACHINERY CO., LTD., Taichung (TW)

(72) Inventor: Tsui-O Liu, Taichung (TW)

(73) Assignee: TOP-ONE MACHINERY CO., LTD., Taichung (TW)

( * ) Notice: Subject to any disclaimer, the term of this patent is extended or adjusted under 35 U.S.C. 154(b) by 0 days.

(21) Appl. No.: 16/226,025

(22) Filed: Dec. 19, 2018

(51) Int. Cl.
*B23C 3/00* (2006.01)
*B23C 1/12* (2006.01)
(Continued)

(52) U.S. Cl.
CPC ........ *B23Q 3/062* (2013.01); *B23B 31/16287* (2013.01); *B23B 41/00* (2013.01); *B23C 1/12* (2013.01); *B23C 3/00* (2013.01); *B23P 23/02* (2013.01); *B23Q 1/44* (2013.01); *B23Q 1/4852* (2013.01); *B23Q 1/621* (2013.01); *B23B 2215/08* (2013.01); *B23B 2231/30* (2013.01); *B23C 2215/085* (2013.01); *B23Q 2703/10* (2013.01); *B60B 2310/232* (2013.01);
(Continued)

(58) Field of Classification Search
CPC .......... B23B 2231/30; B23B 31/16287; B23B 2215/08; Y10T 279/1953; Y10T 279/1961; Y10T 279/1291; Y10T 409/307672; Y10T 409/308232; Y10T 409/308512; Y10T 408/93; Y10T 409/305768; Y10T 29/5105; Y10T 409/305544; Y10T 409/3056; Y10T 409/307448; Y10T 409/307896; Y10T 409/30868; Y10T 409/309016; B60B 2310/232; B23C 2215/085; B23C 1/12; B23Q 1/62; B23Q 1/621; B23Q 1/623; B23Q 1/4852

USPC ........ 279/118, 119, 4.12, 110; 409/201, 211, 409/216, 167, 163, 164, 197, 205, 219, 409/225; 408/236; 29/26 R, 26 A
See application file for complete search history.

(56) References Cited

U.S. PATENT DOCUMENTS

| 45,359 | A | * | 12/1864 | Sutter | ............... B23B 31/16195 279/118 |
| 1,426,168 | A | * | 8/1922 | Flick | ................. B23B 31/16287 144/154 |

(Continued)

FOREIGN PATENT DOCUMENTS

| CH | 277394 | A | * | 8/1951 | ............. B23Q 37/00 |
| GB | 524732 | A | * | 8/1940 | ............... B23Q 1/48 |

(Continued)

*Primary Examiner* — Erica E Cadugan
(74) *Attorney, Agent, or Firm* — Birch, Stewart, Kolasch & Birch, LLP

(57) ABSTRACT

A rim drilling and milling machine has a base (10), a column (20), a turret (30), a saddle (40), a table (50), and a fixture unit (60). The fixture unit (60) has a foundation (61) and four clamping seats defined as two first clamping seats (63A) and two second clamping seats (63B). The first clamping seats (63A) are slidably mounted on the foundation (61) along a first radial direction, and are disposed at positions diametrically opposite in the first radial direction. The second clamping seats (63B) are slidably mounted on the foundation (61) along a second radial direction perpendicular to the first radial direction, and are disposed at positions diametrically opposite in the second radial direction. The four clamping seats can clamp at four equiangular points of a wheel rim.

15 Claims, 11 Drawing Sheets

(51) Int. Cl.
    *B23B 41/00*     (2006.01)
    *B23B 31/16*     (2006.01)
    *B23Q 1/48*     (2006.01)
    *B23Q 1/62*     (2006.01)
    *B23Q 3/06*     (2006.01)
    *B23P 23/02*     (2006.01)
    *B23Q 1/44*     (2006.01)

(52) U.S. Cl.
    CPC ....... *B60B 2320/50* (2013.01); *Y10T 29/5105* (2015.01); *Y10T 279/1291* (2015.01); *Y10T 279/1953* (2015.01); *Y10T 408/93* (2015.01); *Y10T 409/3056* (2015.01); *Y10T 409/307672* (2015.01); *Y10T 409/309016* (2015.01)

(56) References Cited

U.S. PATENT DOCUMENTS

| | | | | |
|---|---|---|---|---|
| 3,232,141 | A * | 2/1966 | Swanson | B23Q 1/623 408/90 |
| 4,187,601 | A * | 2/1980 | Aldrin | B23Q 1/48 144/1.1 |
| 4,709,455 | A * | 12/1987 | D'Andrea | B23B 39/205 29/26 A |
| 5,391,024 | A * | 2/1995 | Levine | B23C 3/18 318/568.15 |
| 6,460,862 | B1 * | 10/2002 | Shimizu | B23B 31/16029 279/132 |
| 6,916,026 | B2 * | 7/2005 | Meza | B23B 31/16 157/16 |
| 8,172,489 | B2 * | 5/2012 | Prust | B23B 31/16275 269/134 |
| 9,156,092 | B2 * | 10/2015 | Karlein | B23B 31/16 |
| 10,166,610 | B2 * | 1/2019 | Henke | B23B 31/16233 |
| 10,500,649 | B2 * | 12/2019 | Xue | B23B 31/16 |
| 2008/0058982 | A1 * | 3/2008 | Gray | B25J 9/1602 700/159 |
| 2013/0297064 | A1 * | 11/2013 | Sherbrooke | B23C 3/16 700/190 |
| 2017/0056978 | A1 * | 3/2017 | Su | B23B 41/00 |

FOREIGN PATENT DOCUMENTS

| | | | |
|---|---|---|---|
| JP | 04-152011 A * | 5/1992 | |
| JP | 09-225714 A * | 9/1997 | ......... B23B 2231/30 |
| JP | 2002-052434 A * | 2/2002 | |
| JP | 2006-123047 A * | 5/2006 | |

* cited by examiner

RIM DRILLING AND MILLING MACHINE

BACKGROUND OF THE INVENTION

1. Field of the Invention

The present invention relates to a rim drilling and milling machine, and more particularly to a rim drilling and milling machine that has an excellent clamping stability by having four clamping seats to clamp at four equiangular points of a wheel rim.

2. Description of Related Art

With reference to FIG. 11, a conventional drilling and milling machine substantially has a base 91, a column 92, a turret 93, and a saddle unit 94. The base 91 has a first rail unit 911. The column 92 is fixed on the base 91, protrudes upward from the base 91, and has a vertical rail unit 921. The turret 93 is perpendicularly and slidably connected with the vertical rail unit 921. The saddle unit 94 has a saddle 941 and a table 942. The saddle 941 is slidably connected with the first rail unit 911. The table 942 is connected with the saddle 941, and is horizontally and linearly slidable relative to the saddle 941 along a direction perpendicular to the first rail unit 911.

When a wheel rim 80 is processed with the conventional drilling and milling machine, the wheel rim 80 is clamped by two dampers 95 mounted in the table 942. The position of the wheel rim 80 may be changed with the relative movement between the table 942 and the saddle 941 and the relative movement between the saddle 941 and the first rail unit 911. However, the conventional drilling and milling machine has a poor clamping stability, because the wheel rim 80 is only clamped by two dampers 95 which are arranged at a spaced interval along a longitudinal line of the table 942 to clamp diametrically opposite sides of the wheel rim 80.

To overcome the shortcomings, the present invention tends to provide a rim drilling and milling machine to mitigate or obviate the aforementioned problems.

SUMMARY OF THE INVENTION

The main objective of the invention is to provide a drilling and milling machine for a wheel rim. The drilling and milling machine has four clamping seats, and the clamping seats can clamp at four equiangular points of a wheel rim to provide an excellent clamping stability.

The rim drilling and milling machine has a base, a column, a turret, a saddle, a table, and a fixture unit. The column is fixed on the base, protrudes upward from a top of the base, and has a vertical rail unit. The turret is perpendicularly and slidably connected with the vertical rail unit. The saddle is horizontally and linearly slidably connected with the base. The table is horizontally and linearly slidably connected with the saddle, and a sliding direction of the table is perpendicular to a sliding direction of the saddle. The fixture unit is fixed on a top of the table and has a foundation and four clamping seats. The foundation is mounted on the table and has a first radial direction and a second radial direction perpendicular to each other. The clamping seats are defined as two first clamping seats and two second clamping seats. The first clamping seats are slidably mounted on the foundation along the first radial direction and are disposed at positions diametrically opposite in the first radial direction of the foundation. The second clamping seats are slidably mounted on the foundation along the second radial direction and are disposed at positions diametrically opposite in the second direction of the foundation.

Other objects, advantages and novel features of the invention will become more apparent from the following detailed description when taken in conjunction with the accompanying drawings.

DETAILED DESCRIPTION OF PREFERRED EMBODIMENT

Figure 1:
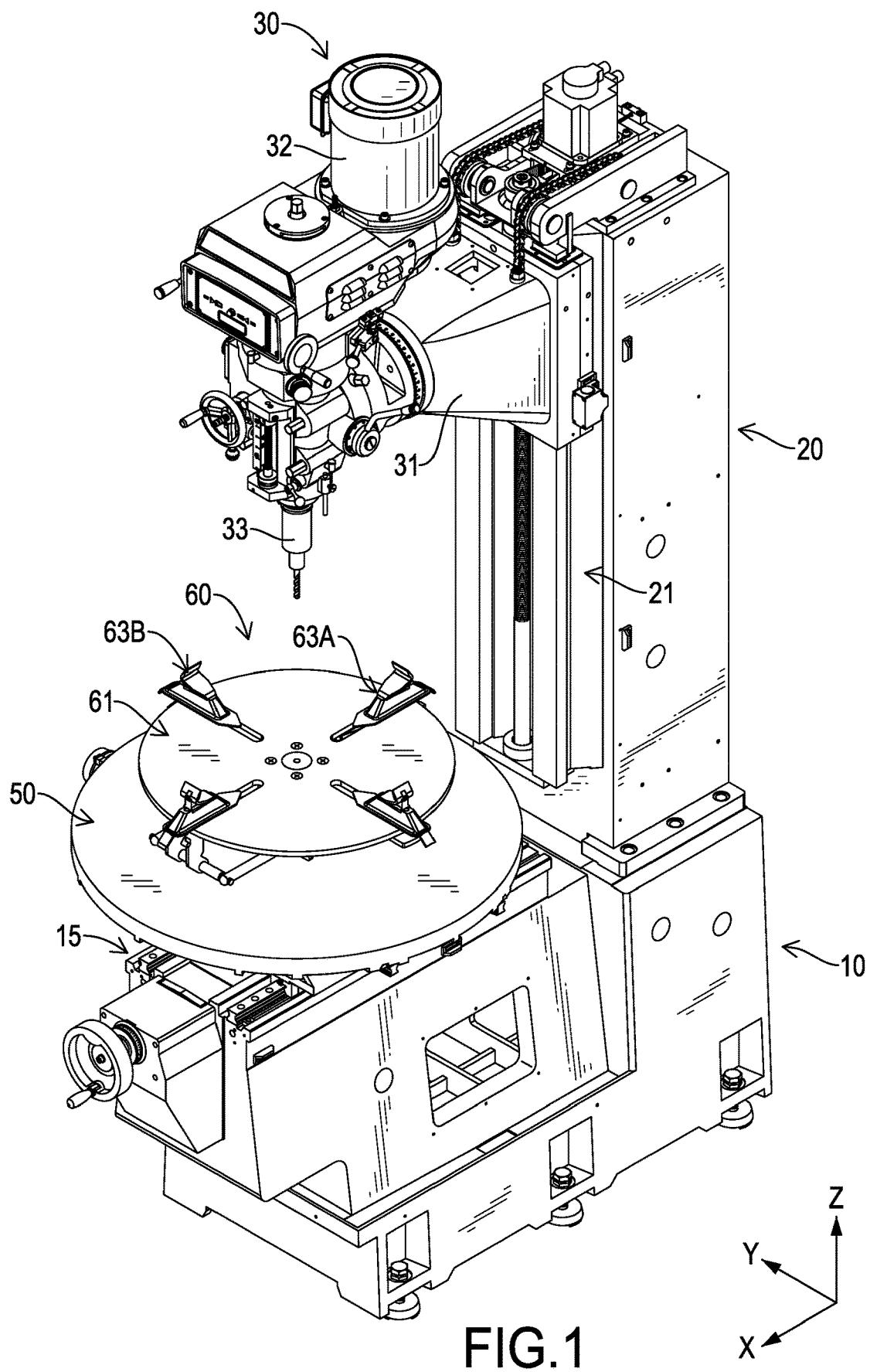
FIG. 1 is a perspective view of a rim drilling and milling machine in accordance with the present invention.
Figure 2:
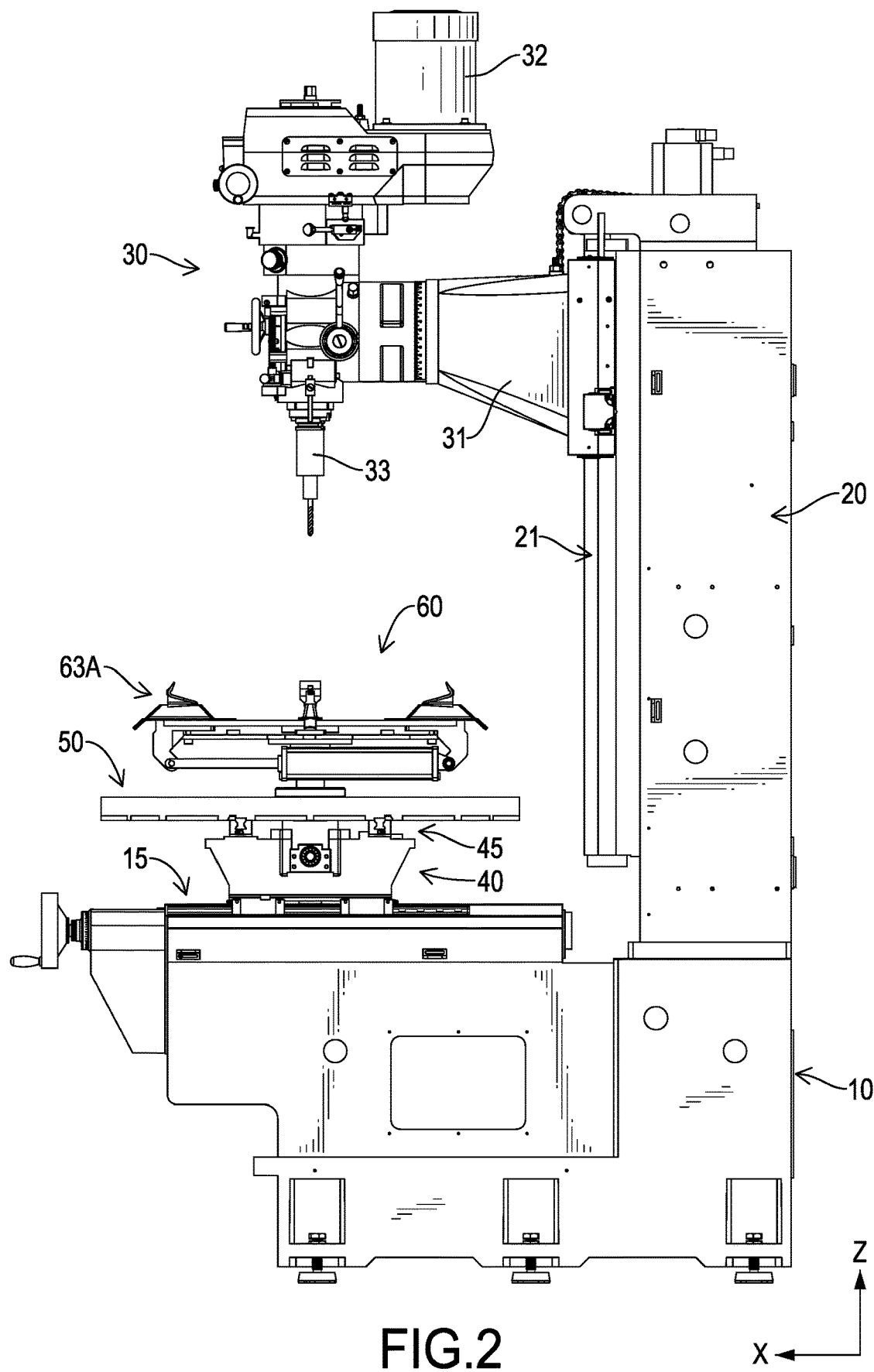
FIG. 2 is a side view of the rim drilling and milling machine in FIG. 1.
Figure 3:
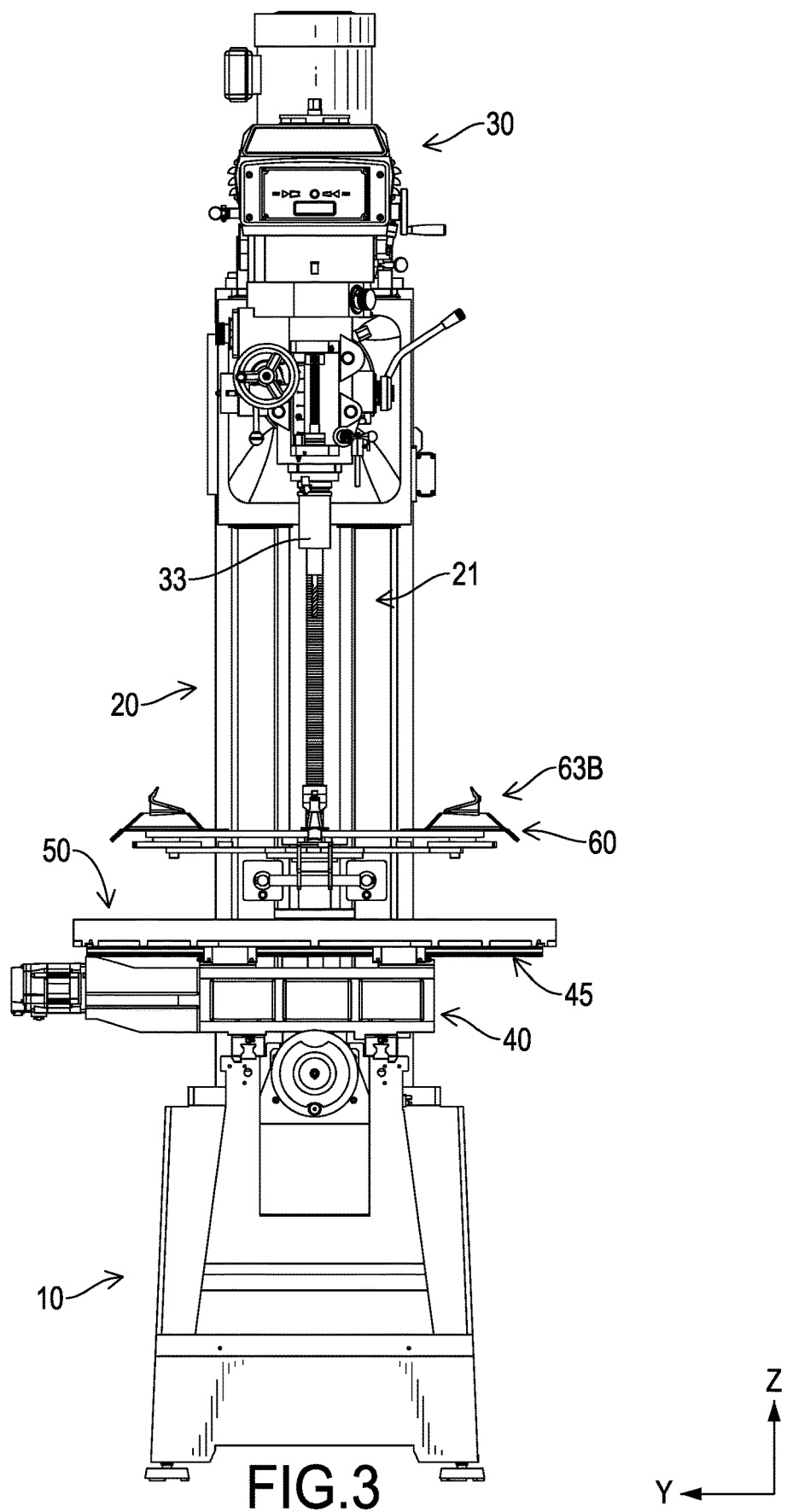
FIG. 3 is an end view of the rim drilling and milling machine in FIG. 1.
Figure 4:
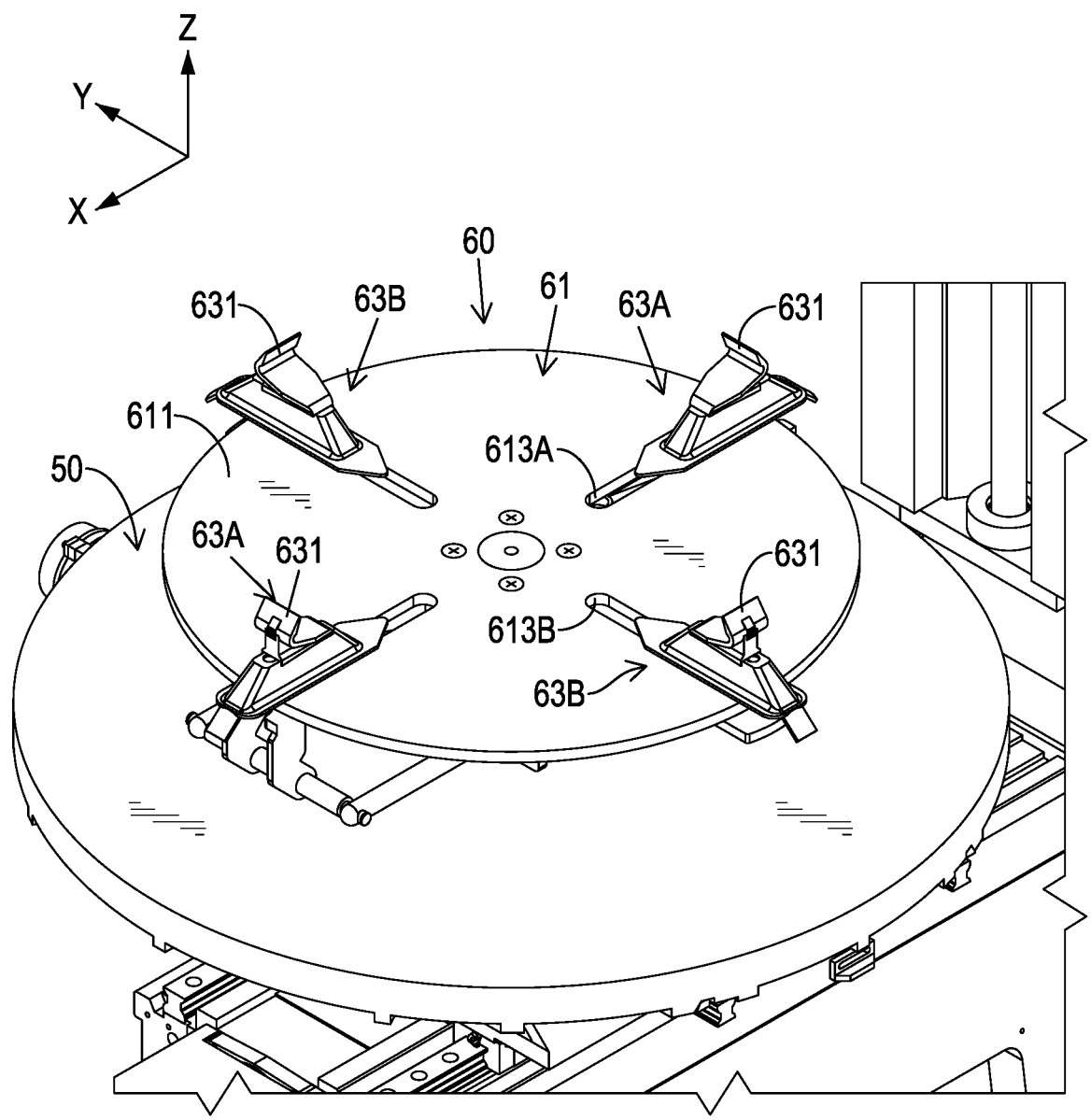
FIG. 4 is an enlarged perspective view of the rim drilling and milling machine in FIG. 1.

With reference to FIGS. 1 to 3, a rim drilling and milling machine in accordance with the present invention has a first axis X, a second axis Y, a third axis Z, a base 10, a column 20, a turret 30, a saddle 40, a table 50, and a fixture unit 60. The first axis X, the second axis Y, and the third axis Z are perpendicular to one another, and the third axis Z is vertical and perpendicular to the horizontal plane.

The column 20 is fixed on the base 10, protrudes upward from the top of the base 10, and has a vertical rail unit 21 extending along the third axis Z. The turret 30 is perpendicularly and slidably connected with the vertical rail unit 21 and has a sliding seat 31, a cutter driving unit 32, and a cutter 33. The sliding seat 31 is perpendicularly and slidably connected with the vertical rail unit 21. The cutter driving unit 32 is applied to drive the cutter 33 for processing a wheel rim.

Figure 5:
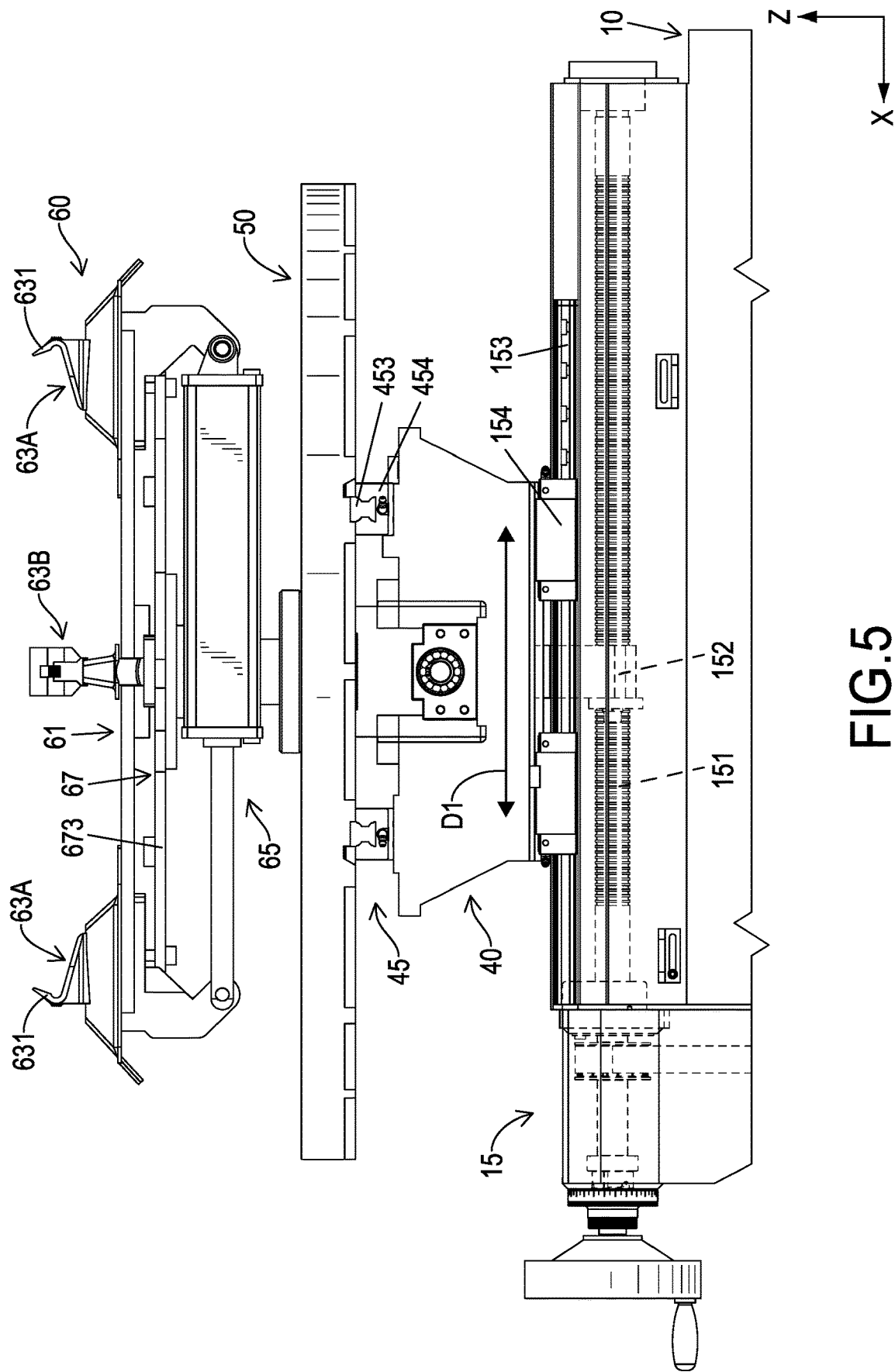
FIG. 5 is an enlarged side view of the rim drilling and milling machine in FIG. 1.
Figure 6:
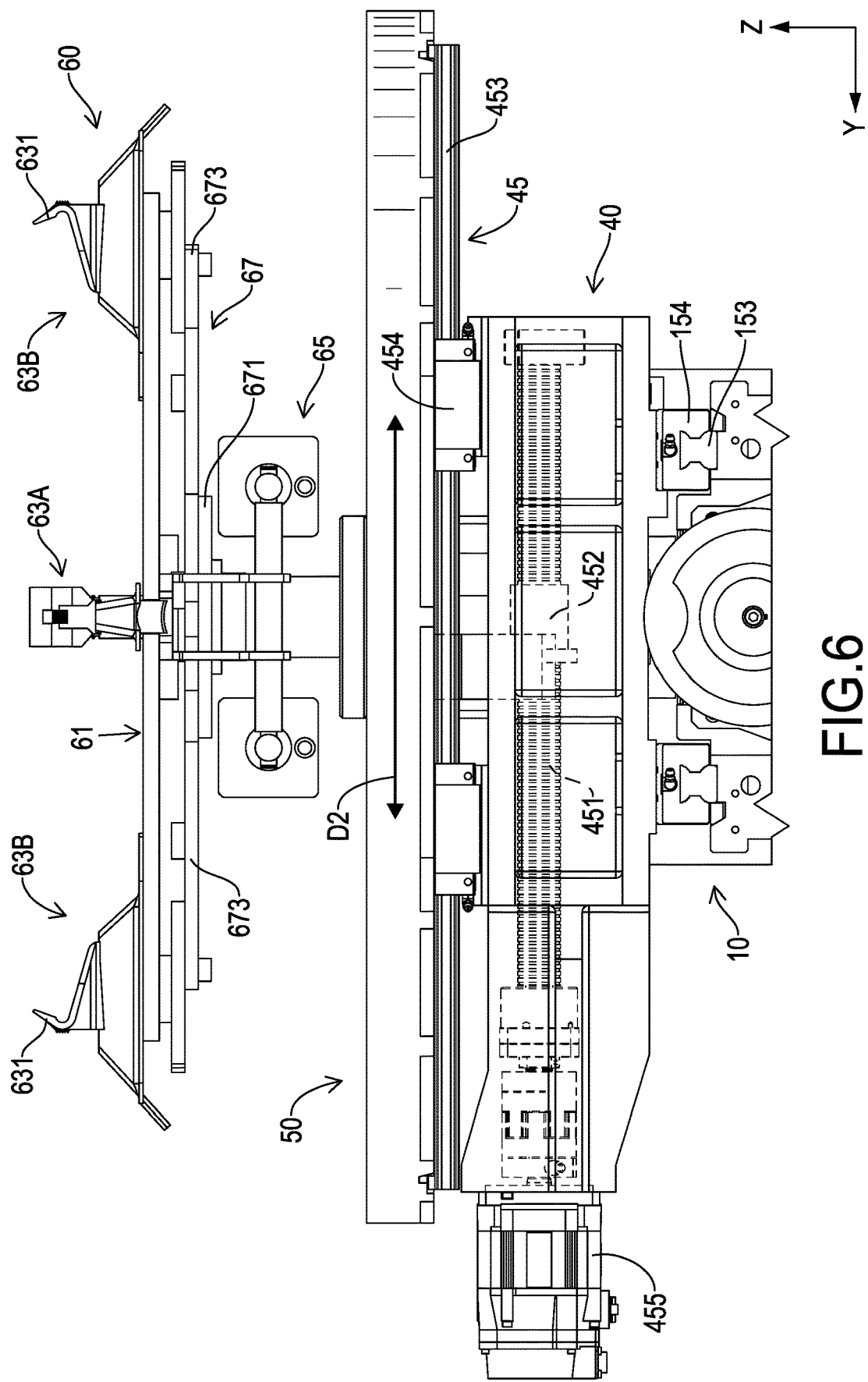
FIG. 6 is an enlarged end view of the rim drilling and milling machine in FIG. 1.

With reference to FIGS. 5 and 6, the saddle 40 is horizontally and linearly slidably connected with the base 10 along the first axis X and has a sliding direction D1 parallel to the first axis X, and a first rail unit 15 is connected with the base 10 and the saddle 40. The first rail unit 15 has a first threaded rod 151, a first threaded base 152, two first sliding rails 153 and multiple first sliding seats 154. The first threaded rod 151 and the first threaded base 152 are connected with each other by threading. The first threaded rod 151 is mounted on the base 10 along the first axis X, and the first threaded base 152 is fixed on the bottom of the saddle 40. The two first sliding rails 153 are respectively disposed on opposite sides of the first threaded rod 151 and are mounted on the base 10 along the first axis X. The first sliding seats 154 are slidably connected with the first sliding rails 153 and are fixed on the saddle 40. The relative position between the saddle 40 and the base 10 along the first axis X can be adjusted with the rotation of the first threaded rod 151.

The table 50 is horizontally and linearly slidably connected with the saddle 40 along the second axis Y and has a sliding direction D2 perpendicular to the sliding direction D1 of the saddle 40 and parallel to the second axis Y, and a second rail unit 45 is connected with the table 50 and the saddle 40. The second rail unit 45 has a second threaded rod 451, a second threaded base 452, two second sliding rails 453, multiple second sliding seats 454, and a threaded rod driving unit 455. The second threaded rod 451 and the second threaded base 452 are connected with each other by threading. The second threaded rod 451 is mounted on the saddle 40 along the second axis Y, and the second threaded base 452 is fixed on the bottom of the table 50. The two second sliding rails 453 are respectively disposed on opposite sides of the second threaded rod 451 and are mounted on the table 50 along the second axis Y. The second sliding seats 454 are slidably connected with the second sliding rails 453 and are fixed on the saddle 40. The threaded rod driving unit 455 is mounted on an end of the second threaded rod 451, and is applied to drive the rotation of the second threaded rod 451 to adjust the relative position between the saddle 40 and the table 50 along the second axis Y.

With reference to FIGS. 4 to 7, the fixture unit 60 is fixed on the top of the table 50 and has a foundation 61 and four clamping seats. The foundation 61 is fixed on the top of the table 50 and has a top plate 611, a first radial direction, and a second radial direction. The top plate 611 is a circular disc and is mounted on the top of the foundation 61. The first radial direction and the second radial direction are perpendicular to each other. In this embodiment, the first radial direction is parallel to the first axis X, and the second radial direction is parallel to the second axis Y, but it is not limited thereto.

The four clamping seats are defined as two first clamping seats 63A and two second clamping seats 63B. The first clamping seats 63A are slidably mounted on the foundation 61 along the first radial direction, are respectively disposed at positions diametrically opposite in the first radial direction of the foundation 61, and protrude from the top plate 611. The second clamping seats 63B are slidably mounted on the foundation 61 along the second radial direction, are respectively disposed at positions diametrically opposite in the second radial direction of the foundation 61, and protrude from the top plate 611. Preferably, the foundation 61 has a first guide path 613A and a second guide path 613B. The first guide path 613A extends along the first radial direction and has two slots respectively formed in the top plate 611 respectively at diametrically opposite positions at the top plate 611 and extending along the first radial direction. The second guide path 613B extends along the second radial direction and has two slots respectively formed in the top plate 611 respectively at diametrically opposite positions at the top plate 611 and extending along the second radial direction. The first clamping seats 63A are respectively mounted in the slots of the first guide path 613A, and are slidable along the first guide path 613A. The second clamping seats 63B are respectively mounted in the slots of the second guide path 613B, and are slidable along the second guide path 613B.

Figure 9:
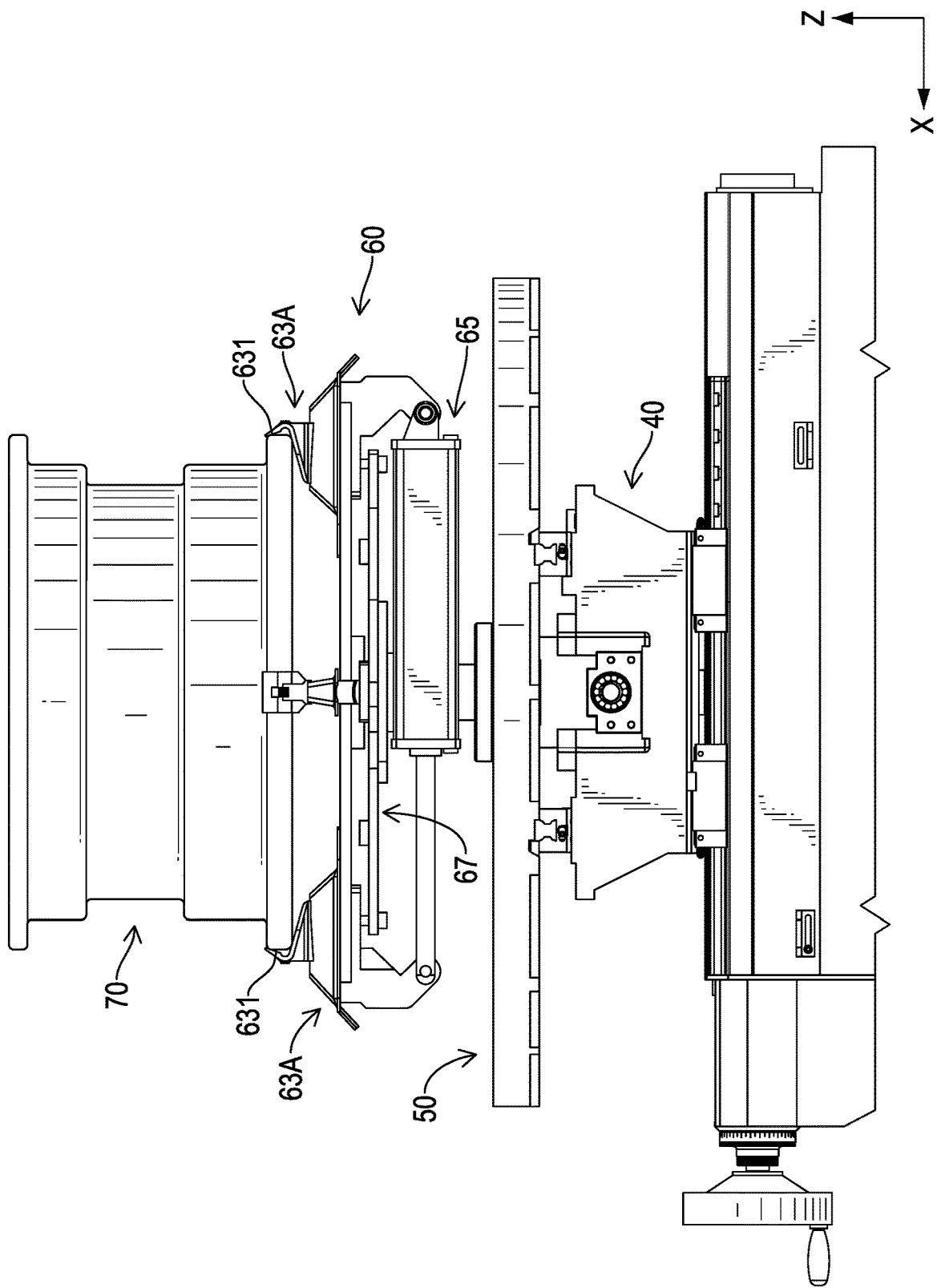
FIG. 9 is an operational side view of the rim drilling and milling machine in FIG. 1 showing the clamp seats clamping a wheel rim.
Figure 10:
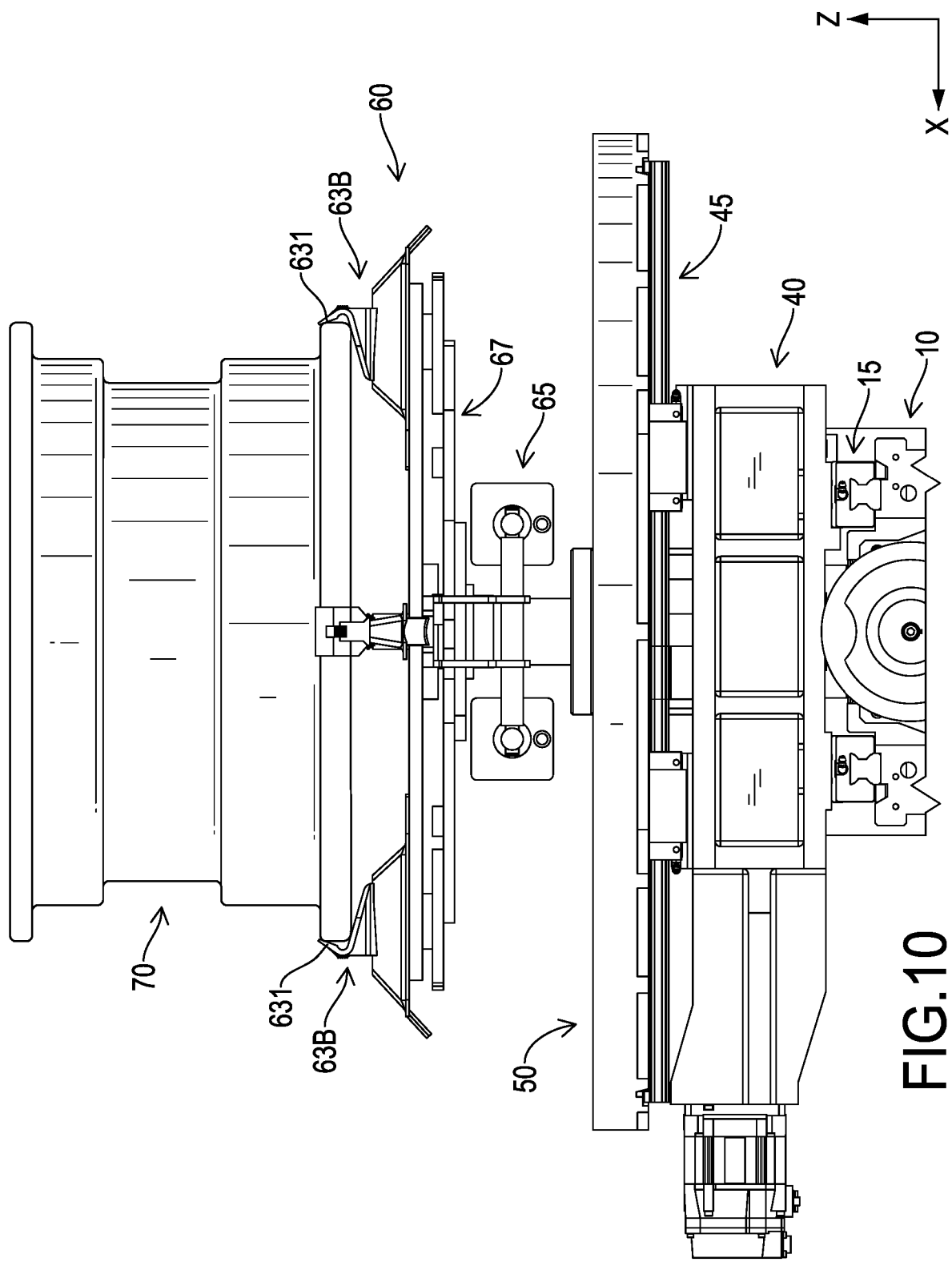
FIG. 10 is an operational end view of the rim drilling and milling machine in FIG. 9.
Figure 11:
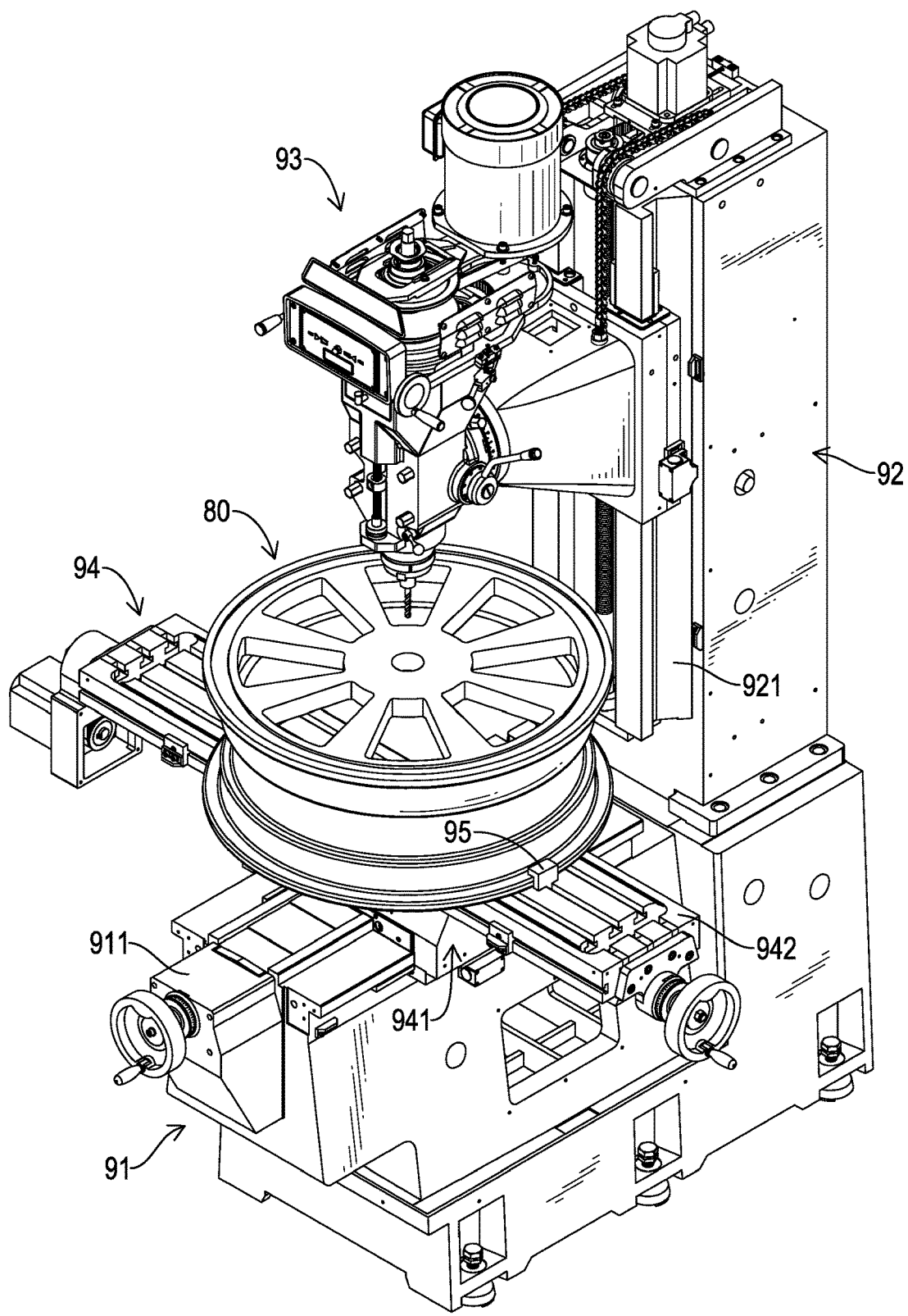
FIG. 11 is a perspective view of a conventional drilling and milling machine.

Each clamping seat has a claw 631 protruding upward. With reference to FIGS. 9 and 10, when clamping a wheel rim 70, the claws 631 of the two first clamping seat 63A clamp at diametrically opposite positions on the wheel rim 70 along the first radial direction, and the claws 631 of the two second clamping seat 63B clamp at diametrically opposite positions on the wheel rim 70 along the second radial direction. The claws 631 clamp at four equiangular points on the wheel rim 70 to improve the clamping stability.

Figure 7:
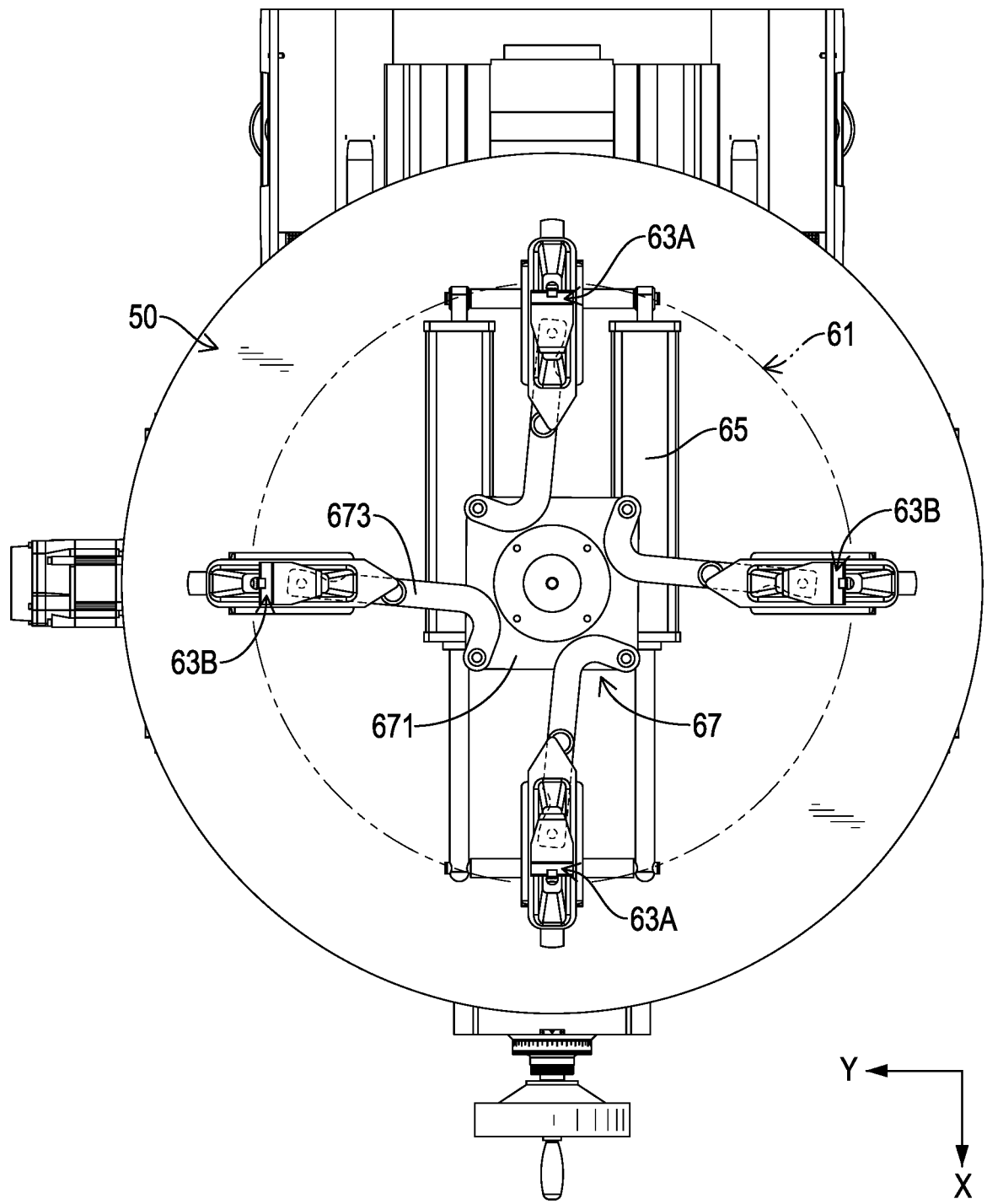
FIG. 7 is an enlarged top view of the rim drilling and milling machine in FIG. 1.

With reference to FIGS. 5 to 7, preferably, the fixture unit 60 further has a linear driving unit 65 and a linkage unit 67. The linkage unit 67 has a linkage seat 671 and four linking rods 673. The linkage seat 671 is rotatably mounted on the foundation 61. The linking rods 673 are connected with the linkage seat 671 and are connected respectively to the clamping seats. The linear driving unit 65 may be a pressure cylinder, and is adjustable in longitudinal length along the first radial direction. Two ends of the linear driving unit 65 are connected respectively to the first clamping seats 63A. The linear driving unit 65 is applied to drive the relative movement of the first clamping seats 63A along the first radial direction.

Figure 8:
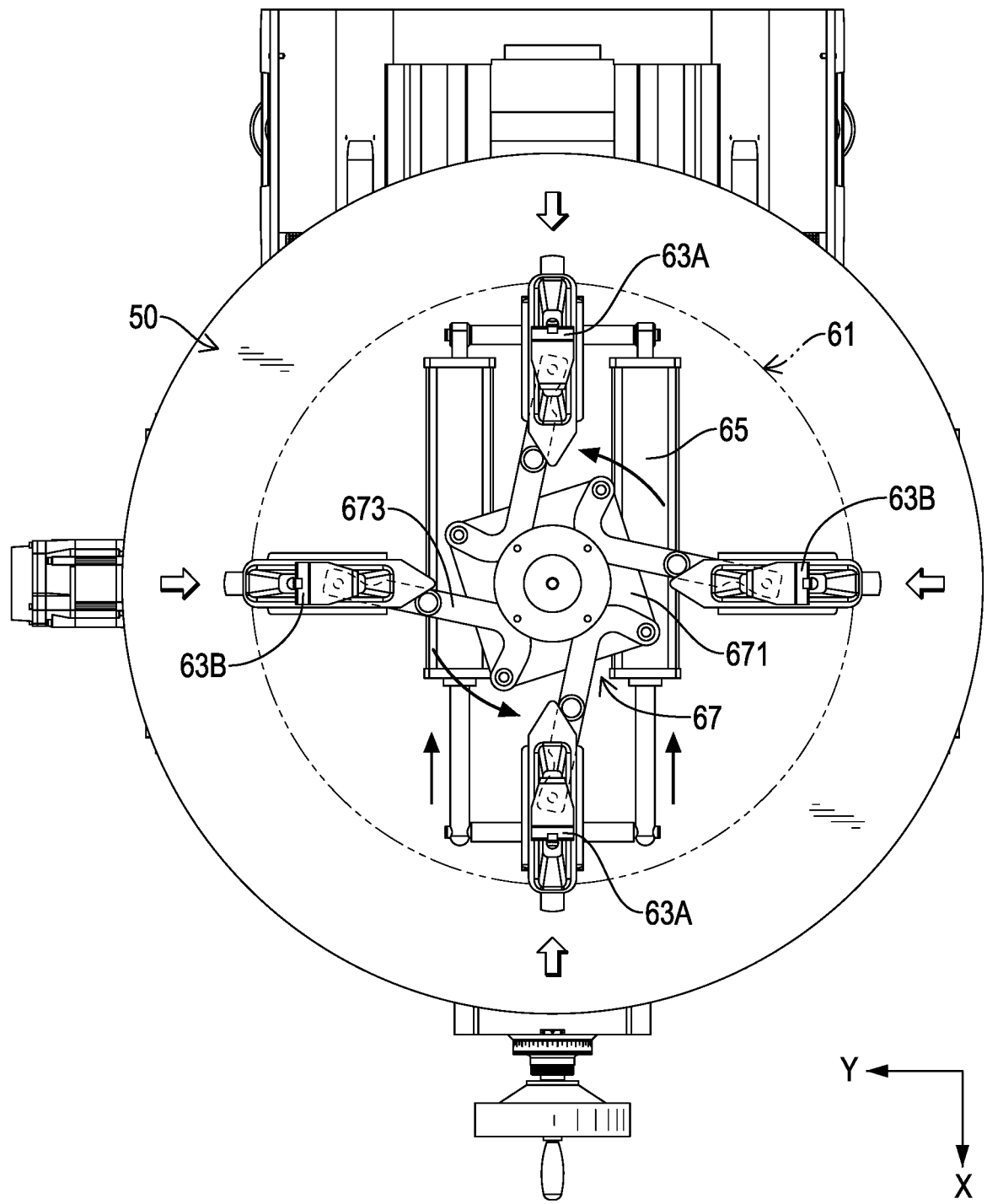
FIG. 8 is an enlarged operational top view of the rim drilling and milling machine in FIG. 1.

With reference to FIGS. 7 and 8, when decreasing the longitudinal length of the linear driving unit 65 along the first radial direction, the first clamping seats 63A are driven to slide toward each other by the linear driving unit 65. Thus, the linkage seat 671 is rotated by the linking rods 673 corresponding to the first clamping seats 63A, and the second clamping seats 63B are driven to slide toward each other by the linking rods 673 corresponding to the second clamping seats 63B. The relative positions of the first clamping seats 63A and the second clamping seats 63B are adjustable simultaneously with the linear driving unit 65, and can be adjusted to fit the size of the wheel rim 70, so as to clamp wheel rims 70 in different sizes.

The rim drilling and milling machine in accordance with the present invention has the following advantages and improvements:

1. The four clamping seats of the fixture unit 60 can clamp at four equiangular points on the wheel rim 70 to clamp the wheel rim 70 stably and tightly, and relative positions of the clamping seats are adjustable to fit with the wheel rims 70 in different sizes.

2. The position of the wheel rim 70 may be changed with the fixture unit 60 by relative movement between the saddle 40 and the base 10 along the first axis X and by relative movement between the saddle 40 and the table 50 along the second axis Y.

3. The fixture unit 60 further has the linkage unit 67, and the relative positions of the clamping seats can be adjusted simultaneously with the linkage unit 67.

4. The fixture unit 60 further has the linear driving unit 65, and the relative movements of the first clamping seats 63A can be driven simultaneously with the linear driving unit 65. The linear driving unit 65 may be further connected with the linkage unit 67 to simultaneously adjust the relative positions of the four clamping seats.

What is claimed is:

1. A rim drilling and milling machine comprising:
   a base;
   a column fixed on the base, protruding upward from a top of the base, and having a vertical rail unit;
   a turret vertically slidably connected with the vertical rail unit;
   a saddle horizontally and linearly slidably connected with the base and having a sliding direction;
   a table horizontally and linearly slidably connected with the saddle and having a sliding direction perpendicular to the sliding direction of the saddle; and
   a fixture unit fixed on a top of the table and having:

a foundation mounted on the table and having:
  a first radial direction; and
  a second radial direction perpendicular to the first radial direction; and
the fixture unit also having four clamping seats defined as two first clamping seats and two second clamping seats, wherein
the first clamping seats are slidably mounted on the foundation for sliding in the first radial direction and are respectively disposed at positions diametrically opposite in the first radial direction of the foundation; and
the second clamping seats are slidably mounted on the foundation for sliding in the second radial direction and are respectively disposed at positions diametrically opposite in the second radial direction of the foundation; and
wherein the fixture unit further has a linkage unit having:
  a linkage seat rotatably mounted on the foundation; and
  four linking rods connected with the linkage seat, each of the linking rods connected to a respective one of the clamping seats;
wherein the fixture unit further has a linear driving unit being adjustable in a longitudinal length of the linear driving unit in the first radial direction and having two ends each connected to a respective one of the first clamping seats.

2. The rim drilling and milling machine as claimed in claim 1, wherein each clamping seat has a respective claw extending upwardly.

3. The rim drilling and milling machine as claimed in claim 2, wherein the foundation of the fixture unit has:
  a first guide path extending along the first radial direction; and
  a second guide path extending along the second radial direction;
  the first clamping seats are respectively connected with the first guide path at opposite positions on the first guide path and are slidable along the first guide path; and
  the second clamping seats are respectively connected with the second guide path at opposite positions on the second guide path and are slidable along the second guide path.

4. The rim drilling and milling machine as claimed in claim 3, wherein the relative positions of the clamping seats can be adjusted simultaneously with the linkage unit.

5. The rim drilling and milling machine as claimed in claim 4, further comprising a cutter drive unit for driving a cutter.

6. The rim drilling and milling machine as claimed in claim 5, wherein the linear driving unit is a pressure cylinder.

7. The rim drilling and milling machine as claimed in claim 3, further comprising a cutter drive unit for driving a cutter.

8. The rim drilling and milling machine as claimed in claim 2, wherein the relative positions of the clamping seats can be adjusted simultaneously with the linkage unit.

9. The rim drilling and milling machine as claimed in claim 8, further comprising a cutter drive unit for driving a cutter.

10. The rim drilling and milling machine as claimed in claim 9, wherein the linear driving unit is a pressure cylinder.

11. The rim drilling and milling machine as claimed in claim 2, further comprising a cutter drive unit for driving a cutter.

12. The rim drilling and milling machine as claimed in claim 1, wherein the relative positions of the clamping seats can be adjusted simultaneously with the linkage unit.

13. The rim drilling and milling machine as claimed in claim 12, further comprising a cutter drive unit for driving a cutter.

14. The rim drilling and milling machine as claimed in claim 13, wherein the linear driving unit is a pressure cylinder.

15. The rim drilling and milling machine as claimed in claim 1, further comprising a cutter drive unit for driving a cutter.

* * * * *